United States Patent
Taniguchi et al.

(10) Patent No.: US 6,814,792 B2
(45) Date of Patent: Nov. 9, 2004

(54) PIGMENT DISPERSION, INKJET INK COMPOSITION USING THE PIGMENT DISPERSION, METHOD OF MANUFACTURING THE INKJET INK COMPOSITION AND IMAGE FORMING METHOD USING THE INKJET INK COMPOSITION

(75) Inventors: Keishi Taniguchi, Susono (JP); Shigeo Hatada, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 10/173,804

(22) Filed: Jun. 19, 2002

(65) Prior Publication Data
US 2003/0121449 A1 Jul. 3, 2003

(30) Foreign Application Priority Data
Jun. 19, 2001 (JP) ........................... 2001-185169
May 2, 2002 (JP) ........................... 2002-130842

(51) Int. Cl.$^7$ ............................... C09D 11/00
(52) U.S. Cl. ................ 106/31.58; 106/31.86; 106/31.43; 106/31.75; 106/499
(58) Field of Search ............. 106/31.58, 31.86, 106/31.43, 31.75, 499

(56) References Cited

U.S. PATENT DOCUMENTS

| | | | | |
|---|---|---|---|---|
| 5,837,043 A | * | 11/1998 | Wong et al. | 106/31.58 |
| 6,051,628 A | * | 4/2000 | Bishop et al. | 523/160 |
| 6,231,652 B1 | * | 5/2001 | Koyano et al. | 106/31.27 |
| 2003/0024439 A1 | * | 2/2003 | Shigeo et al. | 106/503 |
| 2003/0130377 A1 | * | 7/2003 | Taniguchi et al. | 523/160 |

FOREIGN PATENT DOCUMENTS

| | | | |
|---|---|---|---|
| EP | 0 799 870 | | 10/1997 |
| EP | 000924272 A1 | * | 11/1998 |
| EP | 1 116 757 | | 7/2001 |
| GB | 2 349 153 | | 10/2000 |
| JP | 56-147863 | | 11/1981 |
| JP | 57-10660 | | 1/1982 |
| JP | 57-10661 | | 1/1982 |
| JP | 61-83267 | | 4/1986 |
| JP | 63-51485 | | 3/1988 |
| JP | 63-56575 | | 3/1988 |
| JP | 1-15542 | | 3/1989 |
| JP | 1-198671 | | 8/1989 |
| JP | 2-255875 | | 10/1990 |
| JP | 2-276876 | | 11/1990 |
| JP | 10-88050 | | 4/1998 |
| JP | 10095946 A | * | 4/1998 ........... C09D/11/10 |
| JP | 10-168367 | | 6/1998 |
| WO | WO 99/43759 | | 9/1999 |

OTHER PUBLICATIONS

Derwent English Translation of JP 10–95946.*
Patent Abstracts of Japan, JP 8–109344, Apr. 30, 1996.
Patent Abstracts of Japan, JP 2001–146564, May 29, 2001.

* cited by examiner

Primary Examiner—Mark L. Bell
Assistant Examiner—Veronica F. Faison
(74) Attorney, Agent, or Firm—Oblon, Spivak, McClelland, Maier & Neustadt, P.C.

(57) ABSTRACT

A pigment dispersion including a pigment, a dispersant, and a dispersion medium including water, wherein the dispersant includes a compound having the following formula (1):

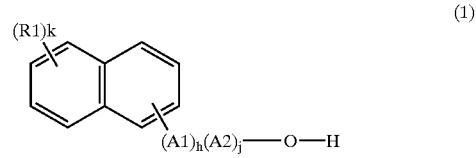

wherein R1 represents an alkyl group having from 1 to 20 carbon atoms, a phenyl group, a substituted phenyl group or a naphthyl group; k is 0 or an integer of from 1 to 7; A1 and A2 independently represent an oxyethylene unit, an oxypropylene unit or a combination of an oxyethylene unit and an oxypropylene unit; and h and j are independently 0 or a positive integer, wherein the total number of h and j is from 31 to 100.

22 Claims, No Drawings

PIGMENT DISPERSION, INKJET INK COMPOSITION USING THE PIGMENT DISPERSION, METHOD OF MANUFACTURING THE INKJET INK COMPOSITION AND IMAGE FORMING METHOD USING THE INKJET INK COMPOSITION

BACKGROUND OF THE INVENTION

1. Field of the Invention

The present invention relates to a pigment dispersion, and an inkjet ink composition useful for ink jet printing using the pigment dispersion. In addition, the present invention relates to a method of manufacturing the inkjet ink composition, and to an image forming method using the inkjet ink composition.

2. Discussion of the Background

As having been disclosed in Japanese Laid-Open Patent Publications Nos. (hereinafter referred to as JOPs) 63-51485, 63-56575 and 01-198671, inkjet inks in which one or more water-soluble dyes are dissolved in water or a mixture solvent including water and a water-soluble solvent and optionally an additive is added to the solution have been developed and used. However, these inkjet inks (hereinafter referred to as dye type inkjet inks) have the following drawbacks:

(1) recorded images have so poor water resistance as to be blurred when the recorded images contact water; and
(2) recorded images have poor light resistance such that when the recorded images are exposed to light, the color tones of the images change or the image density thereof decreases.

In attempting to solve these problems of the dye type inkjet inks, pigment type inkjet inks which use one or more pigments (e.g., carbon black and organic pigments) instead of the dyes have been disclosed in JOPs. 57-10660, 57-10661, 02-255875 and 02-276876 and Japanese Patent Publication No. 01-15542 (i.e., JOP 56-157468).

When pigment type inkjet inks are used, the resultant recorded images, which have dried on a receiving material, have good water resistance and therefore when the images contact water, the images do not blur (i.e., the images have good water resistance). This is because pigments do not dissolve in water. In addition, since pigments have less reactivity with light than dyes, the images recorded by pigment type inks have better light resistance than those recorded by dye type inks.

Such pigment type inkjet inks are typically prepared by the following method:

(1) a mixture including one or more pigments, a dispersing medium and a dispersant is subjected to a dispersing treatment using a dispersing machine such as ball mills and sand mills; and
(2) the thus prepared pigment dispersion is optionally mixed with one or more additives to prepare a pigment type inkjet ink.

When the pigment dispersion for use in an inkjet ink includes pigment particles having a relatively large particle diameter, the nozzles from which the ink is to be discharged are clogged with the large pigment particles included in the resultant inkjet ink, resulting occurrence of a problem in that the ink is not discharged from the nozzles (hereinafter referred to as a clogging problem), and thereby image qualities of the recorded images, such as resolution and color reproducibility deteriorate. Therefore, the pigment dispersion is typically prepared such that the particle diameter of the pigment particles dispersed therein has a particle diameter not greater than 200 nm, and preferably not greater than 150 nm, to prevent the clogging problem and to produce images having good clearness, color reproducibility (in particular, color reproducibility of secondary colors) and transparency.

In order to manufacture pigment type ink jet inks at a relatively low cost, it is needed to quickly prepare a pigment dispersion including such small pigment particles.

In addition, the thus prepared pigment type inkjet inks in which pigments having a fine particle diameter are dispersed have to maintain the initial dispersion state of the pigments to avoid the ink stop problem mentioned above even when used or preserved under various environments such as relatively high or low temperature environments.

However, there is no dispersant, which can quickly disperse a pigment in a dispersion medium such that the pigment achieves and maintains such a small particle diameter for a long period of time. For example, JOP 56-147863 discloses styrene-acrylic copolymers and styrene-maleic acid copolymers as a polymer dispersant. In addition, JOP 61-83267 discloses an ink which uses a condensation product of sodium naphthalenesulfonate with formaldehyde as a polymer dispersant. In addition, inks including surfactants such as polyethylene glycol alkylphenyl ethers (JOP 05-105837, etc.), sulfates of polyethylene glycol alkylphenyl ethers (JOP 10-168367, etc.) and phosphates of polyethylene glycol alkylphenyl ethers (JOP 10-880509, etc.) as a dispersant have been disclosed.

However, even when these dispersants are used for an inkjet ink, the pigments included in the resultant ink have large particle diameter or the initial particle diameter of the pigments cannot be stably maintained when the ink is used or preserved for a long period of time, and therefore the ink has poor ink discharging property.

In addition, there is no additive which can be used together with a dispersant to improve the dispersibility of the pigment used.

Because of these reasons, a need exists for a pigment dispersion which can be prepared in a short time and by which a pigment type inkjet ink capable of producing good images without causing the clogging problem even when used and/or preserved under various environments can be prepared.

SUMMARY OF THE INVENTION

Accordingly, an object of the present invention is to provide a pigment dispersion for use in an inkjet ink composition, which can be efficiently prepared in a relatively short time and by which an inkjet ink composition capable of maintaining a good dispersion state can be prepared.

Another object of the present invention is to provide an inkjet ink composition which can produce images having good image qualities such as good sharpness and color reproducibility even when used and preserved under various environments.

Yet another object of the present invention is to provide a method of manufacturing the inkjet ink composition.

A further object of the present invention is to provide an image forming method by which images having good image qualities such as good sharpness and color reproducibility can be stably recorded even when the inkjet recording is performed under various environments.

Briefly these objects and other objects of the present invention as hereinafter will become more readily apparent can be prepared by a pigment dispersion including at least a pigment, a dispersant and a dispersion medium including water, wherein the dispersant has the following formula (1):

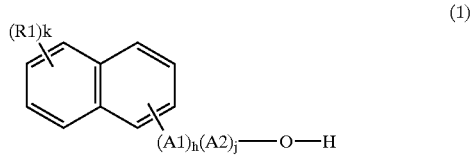
(1)

wherein R1 represents an alkyl group having from 1 to 20 carbon atoms, a phenyl group, a substituted phenyl group or a naphthyl group; k is 0 or an integer of from 1 to 7; A1 and A2 independently represent an oxyethylene unit, an oxypropylene unit or a combination of an oxyethylene unit and an oxypropylene unit; and h and j are independently 0 or a positive integer, wherein the total number of h and j is from 31 to 100.

It is preferable that the pigment dispersion further includes one or more of compounds having the following formula (2), (3) and/or (4):

(2)

wherein R2 represents an alkyl group having from 8 to 14 carbon atoms; A3 represents an oxyethylene unit or a combination of an oxyethylene and an oxypropylene unit; and m is an integer of from 3 to 16;

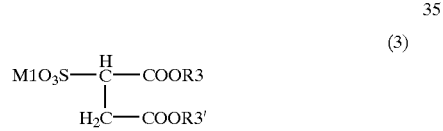
(3)

wherein M1 represents H, Li, Na, K, a group $N^+R4R5R6R7$ in which R4, R5, R6 and R7 independently represent a hydrogen atom, a methyl group, an ethyl group, a 2-hydroxyethyl group or a 3-hydroxypropyl group; and R3 and R3' independently represent an alkyl group having from 1 to 20 carbon atoms; and

(4)

wherein R8 represents an alkyl group having from 1 to 20 carbon atoms; A4 represents an oxyethylene unit, an oxypropylene unit or a combination of an oxyethylene unit and an oxypropylene unit; M2 represents H, Li, Na, K or a group N+R9R10R11R12 in which R9, R10, R11 and R12 independently represent a hydrogen atom, a methyl group, an ethyl group, a 2-hydroxyethyl group or a 3-hydroxypropyl group; and x is an integer of from 1 to 12.

It is preferable that the pigment dispersion includes the compound having formula (1) and the compound having formula (2) (or formula (3) or (4)) at a ratio of from 99.99:0.01 to 60:40.

In addition, it is preferable that the pigment includes Pigment Yellow 138, Pigment Red 122, Pigment Blue 15, Pigment Blue 15:1, Pigment Blue 15:2, Pigment Blue 15:3, Pigment Blue 15:4 or a carbon black is used as the pigment.

The ratio (D/P) of the pigment (P) to the dispersant (D) is preferably from 15/1 to 1/1.

Further, it is preferable that the pigment particles dispersed in the pigment dispersion have a volume average particle diameter of from 20 nm to 200 nm.

The pigment is preferably included in the pigment dispersion in an amount of 5% to 30% by weight based on total weight of the pigment dispersion.

In another aspect of the present invention, an inkjet ink composition is provided which includes the pigment dispersion of the present invention mentioned above and an additive selected from the group consisting of water-soluble organic solvents, surfactants and antiseptics.

It is preferable that the pigment particles dispersed in the inkjet ink composition have a volume average particle diameter of from 20 nm to 200 nm.

In addition, it is preferable that the content of the pigment in the inkjet ink composition is from 1 to 8% by weight.

In yet another aspect of the present invention, an image forming method is provided which includes the steps of providing the inkjet ink composition of the present invention, and projecting the inkjet ink from a nozzle of a recording head to form an ink image on an receiving material. The image forming method preferably uses a piezoelectric inkjet recording head or a thermal inkjet recording head.

In a further aspect of the present invention, a method of manufacturing the inkjet ink composition is provided which includes steps of providing the pigment dispersion mentioned above; and adding at least one of water, water-soluble organic solvents, surfactants and antiseptics.

These and other objects, features and advantages of the present invention will become apparent upon consideration of the following description of the preferred embodiments of the present invention.

DETAILED DESCRIPTION OF THE INVENTION

The pigment dispersion includes at least a pigment, a dispersant and a dispersion medium including water, wherein the dispersant is a compound having the following formula (1):

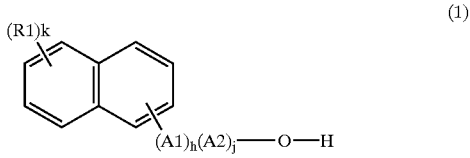
(1)

This pigment dispersion is preferably used for inkjet ink compositions. The inkjet ink composition of the present invention is prepared by adding at least an additive such as water, water-soluble organic solvents, surfactants and antiseptics to the pigment dispersion. By using the above-mentioned dispersant, the pigment particles dispersed in the resultant pigment dispersion have a small average particle diameter and the initial average particle diameter of the pigment particles can be stably maintained. In addition, since the average particle diameter of the pigment dispersed in the -resultant inkjet ink composition can be stably maintained, the ink composition has good ink discharge property.

In formula (1), R1 represents an alkyl group having from 1 to 20 carbon atoms, a phenyl group, a substituted phenyl group or a naphthyl group and k is 0 or an integer of from 1 to 7. Specific examples of the substituents of the substituted phenyl group include alkyl groups having 1 to 12 carbon atoms, alkoxy groups having 1 to 12 carbon atoms, halogen atoms, aralkyl groups, aryl groups, etc. R1 is preferably selected from a hydrogen atom or alkyl groups having from 1 to 4 carbon atoms, and is more preferably a hydrogen atom. Numeral k is preferably 0 or an integer of from 1 to 3, and more preferably 0. When R1 is a substituent other than a hydrogen atom, the position of the substituent is preferably the $1^{st}$, $5^{th}$, $7^{th}$ or $8^{th}$ position, and more preferably the $7^{th}$ position.

When the carbon number of R1 is greater than 20, the dispersion stability of the resultant pigment dispersion tends to deteriorate and in addition the viscosity thereof tends to increase.

An oxyethylene unit, an oxypropylene unit or a combination of an oxyethylene unit and an oxypropylene unit can be preferably used as A1 and A2. Numerals h and j independently represent 0 or a positive integer, and the total of h and j is preferably from 31 to 100, and more preferably from 31 to 80. When the total of h and j is greater than 100, the viscosity of the pigment dispersion and ink tends to increase and in addition the initial average particle diameter of the pigment dispersed therein tends not to be stably maintained.

The position of the substituent A1 is preferably the $1^{st}$, $2^{nd}$, $3^{rd}$ or $4^{th}$ position and more preferably the $2^{nd}$ or $3^{rd}$ position.

When a surfactant having formula (2), (3) or (4) mentioned above is used in combination with the dispersant having formula (1), the dispersibility of the pigment included in the pigment dispersion can be further improved.

In formula (2), the substituent R2 is preferably an alkyl group having from 8 to 14 carbon atoms, preferably from 8 to 12 carbon atoms and more preferably 10 carbon atoms. When the carbon number is less than 8 and greater than 14, the initial average particle diameter of the pigment dispersed therein tends to be hardly maintained stably. Similarly to substituents A1 and A2, an oxyethylene unit, an oxypropylene unit or a combination of an oxyethylene unit and an oxypropylene unit can be preferably used as A3. Numeral m is an integer of from 3 to 16, preferably from 5 to 10 and more preferably 7. When m is less than 3 or greater than 16, the initial average particle diameter of the pigment dispersed therein tends to be hardly maintained stably.

In formula (3), the substituent R3 is an alkyl group having from 1 to 20 carbon atoms, preferably from 5 to 12 carbon atoms and more preferably 8 carbon atoms. In addition, the substituents R4 to R7 are independently a hydrogen atom, a methyl group, an ethyl group, a 2-hydroxyethyl group or a 3-hydroxypropyl group, preferably a methyl group or an ethyl group and more preferably a methyl group. When the substituent R3 is H or an alkyl group having 21 or more carbon atoms, the initial average particle diameter of the pigment dispersed therein tends to be hardly maintained stably.

M1 represents H, Li, Na, K, a group $N^+R4R5R6R7$ in which R4, R5, R6 and R7 independently represent a hydrogen atom, a methyl group, an ethyl group, a 2-hydroxyethyl group or a 3-hydroxypropyl group.

In formula (4), the substituent R8 is an alkyl group having from 1 to 20 carbon atoms, preferably from 5 to 18 carbon atoms and more preferably 13 carbon atoms. When the substituent R8 is a hydrogen atom or an alkyl group having 21 or more carbon atoms, the initial average particle diameter of the pigment dispersed therein tends to be hardly maintained stably. An oxyethylene unit, an oxypropylene unit or a combination of an oxyethylene unit and an oxypropylene unit can be preferably used as A4. Numeral x denotes an integer of from 1 to 12, preferably from 1 to 8 and more preferably 3. The substituents R9 to R12 are independently a hydrogen atom, a methyl group, an ethyl group, a 2-hydroxyethyl group or 3-hydroxypropyl group. When x is 0 or an integer greater than 12, the average particle diameter of the pigment dispersed therein tends to be hardly maintained stably.

M2 represents H, Li, Na, K or a group $N^+R9R10R11R12$ in which R9, R10, R11 and R12 independently represent a hydrogen atom, a methyl group, an ethyl group, a 2-hydroxyethyl group or a 3-hydroxypropyl group.

The weight ratio (1)/(2) of the compound having formula (1) to the compound having formula (2) included in the pigment dispersion and inkjet ink composition of the present invention is preferably 99.99/0.01 to 60/40, more preferably from 99.9/0.1 to 90/10 and even more preferably from 99.9/0.1 to 97/3. When the weight ratio is greater than 99.99/0.01, the effect of the compound having formula (2) is little and therefore the effect in improving stability of the initial average particle diameter of the pigment used is little. When the weight ratio is less than 60/40, the effect in improving stability of the initial average particle diameter of the pigment included in the dispersion and inkjet ink composition is little.

For the same reason as mentioned above, the weight ratio (1)/(3) of the compound having formula (1) to the compound having formula (3) included in the pigment dispersion and ink composition of the present invention is also preferably 99.99/0.01 to 60/40, more preferably from 99.9/0.1 to 90/10 and even more preferably from 99.9/0.1 to 97/3.

For the same reason as mentioned above, the weight ratio (1)/(4) of the compound having formula (1) to the compound having formula (4) included in the pigment dispersion and inkjet ink composition of the present invention is also preferably 99.99/0.01 to 60/40, more preferably from 99.9/0.1 to 90/10 and even more preferably from 99.9/0.1 to 97/3.

Suitable pigments for use in the pigment dispersion of the present invention include known black and colored pigments.

Specific examples of such black pigments include carbon blacks such as furnace black, lamp black, acetylene black and channel black; powders including one or more metals such as copper powder, iron powder and titanium oxide powders; and organic pigments such as o-nitroaniline black and the like.

Specific examples of the yellow pigments include Pigment Yellows 1, 2, 3, 12, 13, 14, 16, 17, 73, 74, 75, 83, 93, 95, 97, 98, 114, 120, 128, 129, 138, 150, 151, 154, 155, 180, etc.

Specific examples of the magenta pigments include Pigment Reds 5, 7, 12, 48 (Ca), 48 (Mn), 57 (ca), 57:1, 112, 122, 123, 168, 184 and 202; Pigment Violet 19, etc.

Specific examples of the cyan pigments include Pigment Blue 1, 2, 3, 15, 15:1, 15:2, 15:3, 15:4, 16, 22 and 60; Vat Blue 4 and 6, etc.

Specific examples of other color pigments include toluidine red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkali Blue Toner, Fast Yellow 10G, Disazo Yellow AAMX, Disazo Yellow AAOT, Disazo Yellow AAOA, yellow iron oxide, Disazo Yellow HR, o-nitroaniline orange, dinitroaniline orange, Vulcan Orange, chlorinated Para Red, Brilliant Fast Scarlet, Naphthol Red 23, Pyrazolone red, Barium Red 2B, Calcium Red 2B, Strontium Red 2B, Manganese Red 2B, Barium Rithol Red, Pigment Scarlet 3B Lake, Lake Bordeaux 10B, Anthocyne 3B Lake, Anthocyne 5B Lake, Rhodamine 6G Lake, Eosin Lake, red iron oxide, Fanatol Red FGR, Rhodamine B Lake, Methyl Violet Lake, dioxane violet, Basic Blue 5B Lake, Basic Blue 6G Lake, Fast Sky Blue, Alkali Blue R Toner, Peacock Blue Lake, Prussian Blue, ultramarine blue, Reflex Blue 2G, Reflex Blue R, Brilliant Green Lake, Diamond Green, Thioflavine Lake, Phthalocyanine Green G, Green Gold, Phthalocyanine Green Y, iron oxide powders, red rust, zinc oxide, titanium oxide, calcium carbonate, clay, barium sulfate, alumina, alumina white, aluminum powders, bronze powders, fluorescent pigments, pearl pigments, Naphthol Carmine FB, Naphthol Red M, Permanent Carmine FB, Fast Yellow G, Disazo Yellow AAA, dioxane violet, Alkali Blue G Toner and the like. In addition, process pigments which are prepared by grafting a resin on a pigment can also be used. These pigments can be used alone or in combination.

Among these pigments, carbon blacks, Pigment Yellow 138, Pigment Red 122 and Pigment Blues 15, 15:1, 15:2, 15:3 and 15:4 are preferably used as a black color pigment, a yellow color pigment, a magenta color pigment and a cyan color pigment, respectively, because of having good dispersion stability, color reproducibility, and light resistance. With respect to Pigment Red 122, Pigment Red 122 which is subjected to a surface treatment with a derivative of Pigment Red 122 is preferably used because of having good dispersion property.

The concentration of a pigment in the pigment dispersion of the present invention is preferably from 5 to 30% by weight, more preferably from 15 to 30% and even more preferably from 20 to 27%. When the concentration is less than 5%, the productivity of the pigment dispersion is low. To the contrary, when the concentration is greater than 30%, it becomes hard to prepare a pigment dispersion because the dispersion has too high viscosity.

One or more organic solvents which can be mixed with water (hereinafter referred to as water-soluble organic solvents) can be included in the pigment dispersion of the present invention and inkjet ink composition using the pigment dispersion. Specific examples of such water-soluble organic solvents include alcohols having from 1 to 4 carbon atoms such as methyl alcohol, ethyl alcohol, n-propyl alcohol, isopropyl alcohol, n-butyl alcohol, sec-butyl alcohol and tert-butyl alcohol: amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols having from 2 to 6 carbon atoms such as ethylene glycol, propylene glycol, butylene glycol, triethylene glycol, 1,2,6-hexanetriol, thiodiglycol, hexylene glycol and diethylene glycol; alkyl ethers of a polyhydric alcohol, such as glycerin, ethylene glycol monomethyl ether, ethylene glycol monoethyl ether, triethylene glycol monomethyl ether and triethylene glycol monoethyl ether; and other solvents such as N-methyl-2-pyrrolidone, 2-pyrrolidone and 1,3-dimethyl-2-imidazolydinone.

Among these water-soluble solvents, polyhydric alcohols such as diethylene glycol, and low alkyl ethers of a polyhydric alcohol such as triethylene glycol monomethyl ether and triethylene glycol monoethyl ether are preferable.

The pigment dispersion of the present invention can be prepared, for example, by the following method:

(1) one or more pigments and one or more dispersants are added in water or a mixture solvent of water and one or more water-soluble organic solvents; and
(2) the mixture is dispersed using a known dispersing machine such as sand mills, pearl mills, Dyno mills, ball mills, roll mills, nanomizers, homogenizers and the like.

The inkjet ink composition of the present invention can be prepared, for example, by the following method:

(1) the above-prepared pigment dispersion, water (dispersing medium) optionally including a water-soluble organic solvent, and one or more additives such as surfactants are mixed while agitating;
(2) the mixture is filtered or centrifuged to remove large particles in the mixture; and then
(3) bubbles of air and/or gases in the mixture are removed to prepare an inkjet ink composition.

In the present invention, one or more of compounds having a formula selected from the group consisting of formulae (2), (3) and (4) may be added when the pigment used is dispersed. Alternatively the compounds may be added when the inkjet ink composition is prepared.

In the present invention, the weight ratio (P/D) of the pigment (P) to the dispersant (D) included in the pigment dispersion and inkjet ink composition is preferably from 15/1 to 1/1, more preferably from 5/1 to 1/1 and even more preferably 3/1 to 1/1. When the ratio is less than 15/1, the effect of the dispersant such that pigment particles are stably dispersed in a dispersion medium is hardly exerted. To the contrary, when the ratio is greater than 1/1, the resultant inkjet ink composition has too high viscosity and thereby it becomes hard to form images using a normal inkjet printer.

The pigment particles dispersed in the pigment dispersion and inkjet ink composition preferably have an average particle diameter of from 20 nm to 200 nm, more preferably from 20 to 100 nm and even more preferably from 20 to 50 nm. When the average particle diameter is greater than 200 nm, the clogging problem tends to occur in inkjet printing nozzles, and in addition clear color images cannot be obtained. To the contrary, when the average particle diameter is less than 20 nm, the preservability of the inkjet ink tends to deteriorate and the light resistance of the resultant recorded images tends to deteriorate. Further, the manufacturing costs of the pigment dispersion and inkjet ink composition increase because it takes a long time to prepare a pigment dispersion including such small pigment particles. In the present invention, the average particle diameter of a pigment is measured by an instrument, Microtrack UPA manufactured by Nikkiso Co., Ltd.

The inkjet ink composition of the present invention is prepared, for example, by adding one or more additives such as water-soluble solvents, surfactants and antiseptics to the pigment dispersion of the present invention.

Specific examples of such water-soluble solvents include alcohols such as methanol, ethanol, 1-propanol, and 2-propanol; polyhydric alcohols such as ethylene glycol, diethylene glycol, triethylene glycol, propylene glycol and glycerin; monoether derivatives and diether derivatives prepared by subjecting one of the polyhydric alcohols mentioned above and one of the alcohols mentioned above to a condensation reaction; pyrrolidone derivatives such as N-methyl pyrrolidone and 2-pyrrolidone; ketones such as acetone and methyl ethyl ketone; alkanol amines such as monoethanol amine, diethanol amine, triethanol amine; and the like solvents.

Specific examples of the surfactants include known surfactants such as anionic surfactants, cationic surfactants, nonionic surfactants and ampholytic surfactants.

Specific examples of the anionic surfactants include alkylaryl sulfonates, alkylphosphates, alkylsulfates, alkylsulfonates, alkylethersulfates, alkylsulfosuccinates, alkylnaphthalenesulfonates, alkylestersulfates, alkylbenzenesulfonates, alkyldiphenyletherdisulfonates, alkylaryltherphosphates, olefinsulfonates, alkaneolefinsulfonates, polyoxyethylenealkyletherphosphates, polyoxyethylenealkylethersulfates, ethercarboxylate, sulfosuccinates, α-sulfofatty acid esters, fatty acid esters, condensation products of a higher fatty acid with an amino acid, naphthenates, etc.

Specific examples of cationic surfactants include alkylamine salts, dialkylamine salts, aliphatic amine salts, benzalkonium salts, quaternary ammonium salts, alkylpyridinium salts, imidazolinium salts, sulfonium salts, onium salts, etc.

Specific examples of nonionic surfactants include polyoxyethylene alkyl ethers, polyoxyethylene alkyl ally esters, polyoxyethylene alkyl phenyl ethers, polyoxyethylene glycol esters, polyoxyethylene fatty acid amides, polyoxyethylene fatty acid esters, polyoxyethylene polyoxypropylene glycol, glycerin esters, sorbitane esters, sucrose esters, polyoxyethylene ethers of a glycerin ester, polyoxyethylene ethers of a sorbitane ester; polyoxyethylene ethers of a sorbitol ester, fatty acid alkanol amides, amineoxides, polyoxyethylene alkyl amines, glycerin fatty acid esters, sorbitane fatty acid esters, polyoxyethylene sorbitane fatty acid esters, polyoxyethylene sorbitol fatty acid esters, alkyl(poly) glycoxide, etc.

Specific examples of the ampholytic surfactants include imidazoline derivatives such as imidazolinium betaine; dimethylalkyllauryl betaine, alkyl glycin, alkyldi(aminoethyl) glycin, etc.

The concentration of a pigment in the inkjet ink composition of the present invention is preferably from 1 to 8% by weight. When the pigment concentration is lower than 1%, the resultant printed images has low image density, and therefore clear color images cannot be obtained. To the contrary, when the pigment concentration is higher than 8%, the viscosity of the resultant inkjet ink tends to increase. In addition, the clogging problem tends to occur.

The additives mentioned above for use in the pigment dispersion can also be used for the inkjet ink. The content of the water-soluble solvent is preferably from 0 to 50%, more preferably from 5 to 40% and even more preferably from 10 to 30% by weight, based on total weight of the inkjet ink.

The inkjet ink of the present invention is prepared by mixing the pigment dispersion with one or more additives such as water, water-soluble organic solvents, surfactants and antiseptics.

Specific examples of the water-soluble organic solvents, and surfactants are mentioned above.

The content of the surfactant in the ink composition of the present invention is 0.01 to 5.0% by weight, and preferably from 0.05 to 3% by weight based on total weight of the ink composition.

Specific examples of the antiseptic (or antimildew) agents include sodium benzoate, sodium pentachlorophnol, sodium 2-pyridinethiol-oxide, sodium sorbate, sodium dehydroacetate, etc. It is more preferable to use 1,2-dibenzylisothiazoline-3-one (PROXEL CRL, PROXEL LV, PROXEL BDN, and PROXEL GXL, all of which are manufactured by Avecia; and SUNPACK AP manufactured by San-Ai Oil Co., Ltd.), to reduce the alkali metal content of the ink composition.

The inkjet ink composition of the present invention can be used for continuously-projecting type inkjet printing methods and on-demand type inkjet printing methods. The on-demand type inkjet printing methods include piezoelectric inkjet recording methods, thermal inkjet recording methods and electrostatic inkjet recording methods.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Preparation of Pigment Dispersion

The following components were pre-mixed.

| | |
|---|---|
| Pigment Red 122 (tradenamed as Toner Magenta EO2 manufactured by Clariant Japan K.K.) | 30 |
| β-naphthol derivative serving as dispersant and having the following formula: 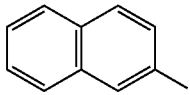 | 15 |
| Heptaethylene glycol mono(5-tridecyl)ether having the following formula $C_{13}H_{27}$—$(OCH_2CH_2)_7OH$ | 0.2 |
| Deionized water | 155 |

Then the mixture was contained in a 1-liter vessel of a batch processing type desktop sand mill manufactured by Kanpe-Hapio Co., Ltd. and including zirconia balls having a particle diameter of 0.3 mm in an amount of 900 g and dispersed for 48 hours. Thus a pigment dispersion (A) was prepared.

The average particle diameter of the pigment in the thus prepared dispersion (A), which was measured by Microtrack UPA150 manufactured by Nikkiso Co., Ltd., was 140.5 nm. In addition, the pigment dispersion, which was contained in a closed plastic container, was preserved at 70° C. for 1 week. The average particle diameter of the pigment in the preserved pigment dispersion was 146.4 nm as shown in Table 1. Namely, the average particle diameter of the pigment hardly changed.

Preparation of Inkjet Ink

The following components were mixed.

| | |
|---|---|
| Pigment dispersion (A) | 40.00 |
| Glycerin | 7.50 |
| Diethylene glycol | 22.50 |
| 2-pyrrolidone | 3.00 |
| Sodium polyoxyethylene alkyl ether acetate having the following formula $C_{13}H_{27}O-(CH_2-CH_2O)_3-CH_2-COONa$ | 0.45 |
| Distilled water | 76.55 |

The mixture was agitated for 30 minutes. Then the mixture was filtered using a Membrane filter having holes of 0.8 μm in diameter, and vacuum deaerated to remove air bubbles therein.

Thus an inkjet ink (a) of the present invention was prepared. The average particle diameter of the pigment in the inkjet ink composition was also measured by the same method as mentioned above before and after the preservation test. The results are shown in Table 2.

Example 2

Preparation of Pigment Dispersion

The procedure for preparation of the pigment mixture (A) in Example 1 was repeated except that the formulation was changed to the following.

| | |
|---|---|
| Pigment Blue 15:3 (tradenamed as LIONOL BLUE FG-7351 manufactured by Toyo Ink Mfg. Co., Ltd.) | 30 |
| β-naphthol derivative serving as dispersant and having the following formula | 15 |

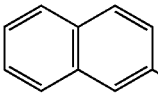

$(OCH_2CH_2CH_2)_6(OCH_2CH_2)_{30}OH$

| | |
|---|---|
| Sodium dioctyl sulfosuccinate having the following formula | 0.2 |

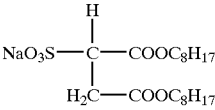

(the $C_8H_{17}-$ group is a branched alkyl group)

| | |
|---|---|
| Distilled water | 155 |

Thus, a pigment dispersion (B) was prepared. The particle diameter of the pigment of the pigment dispersion (B) before and after the preservation test is shown in Table 1.

Preparation of Inkjet Ink

The procedure for preparation of the inkjet ink (a) was repeated except that the pigment dispersion (A) was replaced with the pigment dispersion (B).

Thus, an inkjet ink (b) of the present invention was prepared. The particle diameter of the pigment of the inkjet ink (b) before and after the preservation test is shown in Table 2.

Example 3

Preparation of Pigment Dispersion

The procedure for preparation of the pigment mixture (A) in Example 1 was repeated except that the formulation was changed to the following.

| | |
|---|---|
| Pigment Yellow 138 (tradenamed as LIONOGEN YELLOW 1010 manufactured by Toyo Ink Mfg. Co., Ltd.) | 30 |
| β-naphthol derivative serving as dispersant and having the following formula | 15 |

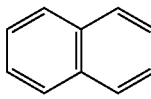

$(OCH_2CH_2CH_2)_{12}(OCH_2CH_2)_{48}OH$

| | |
|---|---|
| Sodium polyoxyethylene alkyl ether acetate having the following formula $C_{13}H_{27}O-(CH_2CH_2O)_3CH_2COONa$ | 0.2 |
| Distilled water | 115 |

Thus, a pigment dispersion (C) was prepared. The particle diameter of the pigment of the pigment dispersion (C) before and after the preservation test is shown in Table 1.

Preparation of Inkjet Ink

The procedure for preparation of the inkjet ink (a) was repeated except that the pigment dispersion (A) was replaced with the pigment dispersion (C).

Thus, an inkjet ink (c) of the present invention was prepared. The particle diameter of the pigment of the inkjet ink (c) before and after the preservation test is shown in Table 2.

Example 4

Preparation of Pigment Dispersion

The procedure for preparation of the pigment mixture (A) in Example 1 was repeated except that the formulation was changed to the following.

| | |
|---|---|
| Pigment Yellow 138 (tradenamed as LIONOGEN YELLOW 1010 manufactured by Toyo Ink Mfg. Co., Ltd.) | 30 |
| β-naphthol derivative serving as dispersant and having the following formula | 15 |

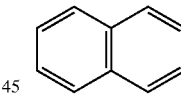

$(OCH_2CH_2CH_2)_8(OCH_2CH_2)_{32}OH$

| | |
|---|---|
| Distilled water | 115 |

Thus, a pigment dispersion (D) was prepared. The particle diameter of the pigment of the pigment dispersion (D) before and after the preservation test is shown in Table 1.

Preparation of Inkjet Ink

The procedure for preparation of the inkjet ink (a) was repeated except that the pigment dispersion (A) was replaced with the pigment dispersion (D).

Thus, an inkjet ink (d) of the present invention was prepared. The particle diameter of the pigment of the inkjet ink (d) before and after the preservation test is shown in Table 2.

Example 5

Preparation of Pigment Dispersion

The procedure for preparation of the pigment dispersion (A) in Example 1 was repeated except that the addition amounts of Pigment Red 122 and distilled water were changed to 15 parts and 170 parts, respectively, to prepare a pigment dispersion (E).

The particle diameter of the pigment of the pigment dispersion (E) before and after the preservation test is shown in Table 1.

Preparation of Inkjet Ink

The procedure for preparation of the inkjet ink (a) was repeated except that the pigment dispersion (A) was replaced with the pigment dispersion (E).

Thus, an inkjet ink (e) of the present invention was prepared. The particle diameter of the pigment of the inkjet ink (e) before and after the preservation test is shown in Table 2.

Example 6

Preparation of Pigment Dispersion

The procedure for preparation of the pigment dispersion (A) in Example 1 was repeated except that the addition amounts of Pigment Red 122, the compound having formula (1) and distilled water were changed to 50 parts, 12 parts and 138 parts, respectively, to prepare a pigment dispersion (F).

The particle diameter of the pigment of the pigment dispersion (F) before and after the preservation test is shown in Table 1.

Preparation of Inkjet Ink

The procedure for preparation of the inkjet ink (a) was repeated except that the pigment dispersion was replaced with the pigment dispersion (F).

Thus, an inkjet ink (f) of the present invention was prepared. The particle diameter of the pigment of the inkjet ink (f) before and after the preservation test is shown in Table 2.

Comparative Example 1

Preparation of Pigment Dispersion

The procedure for preparation of the pigment mixture (A) in Example 1 was repeated except that the formulation was changed to the following.

| | |
|---|---|
| Pigment Red 122 (tradenamed as TONER MAGENTA E02 manufactured by Clariant Japan K. K.) | 30 |
| Polyvinyl pyrrolidone | 15 |
| Sodium polyoxyethylene alkyl ether acetate having the following formula $C_{13}H_{27}O\text{—}(CH_2CH_2O)_3CH_2COONa$ | 0.2 |
| Distilled water | 155 |

Thus, a pigment dispersion (G) was prepared. The particle diameter of the pigment of the pigment dispersion (G) before and after the preservation test is shown in Table 1.

Preparation of Inkjet Ink

The procedure for preparation of the inkjet ink (a) was repeated except that the pigment dispersion (A) was replaced with the pigment dispersion (G).

Thus, an inkjet ink (g) of the present invention was prepared. The particle diameter of the pigment of the inkjet ink (g) before and after the preservation test is shown in Table 2.

Comparative Example 2

Preparation of Pigment Dispersion

The procedure for preparation of the pigment mixture (A) in Example 1 was repeated except that the formulation was changed to the following.

| | |
|---|---|
| Pigment Red 122 (tradenamed as TONER MAGENTA E02 manufactured by Clariant Japan K. K.) | 30 |
| Polyoxyethylene alkylether phosphate (PLYSURF A219B manufactured by Dai-Ichi Kogyo Seiyaku Co., Ltd.) | 15 |
| Distilled water | 155 |

Thus, a pigment dispersion (H) was prepared. The particle diameter of the pigment of the pigment dispersion (H) before and after the preservation test is shown in Table 1.

Preparation of Inkjet Ink

The procedure for preparation of the inkjet ink (a) was repeated except that the pigment dispersion (A) was replaced with the pigment dispersion (H).

Thus, an inkjet ink (h) of the present invention was prepared. The particle diameter of the pigment of the inkjet ink (h) before and after the preservation test is shown in Table 2.

Comparative Example 3

Preparation of Pigment Dispersion

The procedure for preparation of the pigment mixture (A) in Example 1 was repeated except that the formulation was changed to the following.

| | |
|---|---|
| Pigment Red 122 (tradenamed as TONER MAGENTA EO2 manufactured by Clariant Japan K.K.) | 30 |
| β-naphthol derivative serving as dispersant and having the following formula 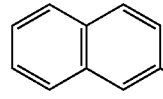 | 15 |
| Heptaethylene glycol mono(5-tridecyl)ether having the following formula $C_{13}H_{27}\text{—}(CH_2CH_2O)_7H$ | 0.2 |
| Distilled water | 155 |

Thus, a pigment dispersion (I) was prepared. The particle diameter of the pigment of the pigment dispersion (I) before and after the preservation test is shown in Table 1.

Preparation of Inkjet Ink

The procedure for preparation of the inkjet ink (a) was repeated except that the pigment dispersion (A) was replaced with the pigment dispersion (I).

Thus, an inkjet ink (i) of the present invention was prepared. The particle diameter of the pigment of the inkjet ink (i) before and after the preservation test is shown in Table 2.

Comparative Example 4

Preparation of Pigment Dispersion

The procedure for preparation of the pigment mixture (A) in Example 1 was repeated except that the formulation was changed to the following.

| | |
|---|---|
| Pigment Red 122 (tradenamed as TONER MAGENTA EO2 manufactured by Clariant Japan K.K.) | 30 |

-continued

β-naphthol derivative serving as dispersant  15
and having the following formula naphthalene-(OCH$_2$CH$_2$CH$_2$)$_{80}$(OCH$_2$CH$_2$)$_{50}$OH Heptaethylene glycol mono(5-tridecyl)ether  0.2
having the following formula
C$_{13}$H$_{27}$—(CH$_2$CH$_2$O)$_7$H
Distilled water  155

Thus, a pigment dispersion (J) was prepared. The particle diameter of the pigment of the pigment dispersion (J) before and after the preservation test is shown in Table 1.

Preparation of Inkjet Ink

The procedure for preparation of the inkjet ink (a) was repeated except that the pigment dispersion (A) was replaced with the pigment dispersion (J).

Thus, an inkjet ink (j) of the present invention was prepared. The particle diameter of the pigment of the inkjet ink (j) before and after the preservation test is shown in Table 2.

Evaluation

1. Pigment Dispersion

The average particle diameter of the pigment included in each pigment dispersion was measured by Microtrack UPA150 manufactured by Nikkiso Co., Ltd.

In addition, the average particle diameter of each pigment dispersion, which had been preserved at 70° C. for 1 week while contained in a closed plastic container, was also measured by the method as mentioned above.

The results are shown in Table 1.

2. Inkjet Ink (1) Average Particle Diameter

The average particle diameter of the pigment included in each inkjet ink was measured by the same method as mentioned above before and after the preservation test performed at 70° C. for 1 week.

The results are shown in Table 2.

(2) Ink Discharging Property

Each inkjet ink was set in each of printers, MJ-930C manufactured by Seiko Epson Corp. and using a piezoelectric inkjet recording method, and DESK JET 880C manufactured by Hewlett-Packard Co. and using a thermal inkjet recording method to evaluate the ink discharging property of the ink.

◯: the clogging problem did not occur.
×: the clogging problem occurred.

The results are shown in Table 2.

TABLE 1

| Pigment dispersion | Average particle diameter before preservation test (nm) | Average particle diameter after preservation test (nm) |
|---|---|---|
| (A) | 140.5 | 146.4 |
| (B) | 108.9 | 111.5 |
| (C) | 90.2 | 90.1 |
| (D) | 124.2 | 129.9 |
| (E) | 115.3 | 118.0 |
| (F) | 144.6 | 150.0 |
| (G) | 220.2 | 270.9 |
| (H) | 222.7 | 246.1 |
| (I) | 210.4 | 230.8 |
| (J) | 270.4 | 266.0 |

TABLE 2

| Pigment dispersion | Average particle diameter before preservation test (nm) | Average particle diameter after preservation test (nm) | Ink discharge property (MJ-930C) | Ink discharge property (DESK JET 880C) |
|---|---|---|---|---|
| (A) | 142.1 | 143.4 | ◯ | ◯ |
| (B) | 107.1 | 108.2 | ◯ | ◯ |
| (C) | 90.5 | 90.3 | ◯ | ◯ |
| (D) | 125.6 | 129.2 | ◯ | ◯ |
| (E) | 118.3 | 121.1 | ◯ | ◯ |
| (F) | 145.1 | 150.7 | ◯ | ◯ |
| (G) | 225.6 | 266.9 | × | × |
| (H) | 222.7 | 263.7 | × | × |
| (I) | 205.9 | 248.8 | × | × |
| (J) | 261.6 | 271.3 | × | × |

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2001-185169 and 2002-130842, filed on Jun. 19, 2001 and May 2, 2002, the entire contents of which are herein incorporated by reference.

What is claimed as new and desired to be secured by Letters Patent of the United States is:

1. A pigment dispersion comprising (a) a pigment, (b) a dispersant, and (c) a dispersing medium comprising water, wherein the dispersant (b) comprises a first compound having the following formula (1):

$$\text{(R1)}_k\text{-naphthalene-(A1)}_h\text{(A2)}_j\text{—O—H} \tag{1}$$

wherein R1 represents an alkyl group having from 1 to 20 carbon atoms, a phenyl group, a substituted phenyl group or a naphthyl group; k is 0 or an integer of from 1 to 7; A1 and A2 are independently an oxyethylene unit or an oxypropylene unit wherein A1 and A2 are not the same; and h and j are independently a positive integer, wherein a total number of h and j is from 31 to 100.

2. The pigment dispersion according to claim 1, further comprising a second compound having a formula selected from the group consisting of the following formulae (2), (3) and (4):

$$\text{R2-(A3)}_m\text{-OH} \tag{2}$$

wherein R2 represents an alkyl group having from 8 to 14 carbon atoms; A3 represents an oxyethylene unit or a combination of an oxyethylene and an oxypropylene unit; and m is an integer of from 3 to 16;

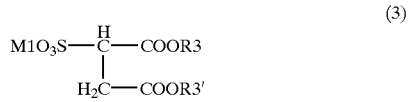

(3)

wherein M1 represents H, Li, Na, K or a group $N^+R4R5R6R7$ in which R4, R5, R6 and R7 independently represent a hydrogen atom, a methyl group, an ethyl group, a 2-hydroxyethyl group or a 3-hydroxypropyl group; and R3 and R3' independently represent an alkyl group having from 1 to 20 carbon atoms; and $$R8O\text{-}(A4)_x\text{-}CH_2COOM2 \qquad (4)$$

wherein R8 represents an alkyl group having from 1 to 20 carbon atoms; A4 represents an oxyethylene unit, an oxypropylene unit or a combination of an oxyethylene unit and an oxypropylene unit; M2 represents H, Li, Na, K or a group $N^+R9R10R11R12$ in which R9, R10, R11 and R12 independently represent a hydrogen atom, a methyl group, an ethyl group, a 2-hydroxyethyl group or a 3-hydroxypropyl group; and x is an integer of from 1 to 12.

3. The pigment dispersion according to claim 2, wherein a ratio of the first compound to the second compound is from 99.99/0.01 to 60/40 by weight.

4. The pigment dispersion according to claim 1, wherein the pigment is selected from the group consisting of Pigment Yellow 138, Pigment Red 122, Pigment Blue 15, Pigment Blue 15:1, Pigment Blue 15:2, Pigment Blue 15:3, Pigment Blue 15:4 and carbon black.

5. The pigment dispersion according to claim 1, wherein a ratio of the pigment to the dispersant is from 15/1 to 1/1 by weight.

6. The pigment dispersion according to claim 5, wherein the pigment is included in the pigment dispersion in an amount of from 5% to 30% by weight based on total weight of the pigment dispersion.

7. The pigment dispersion according to claim 1, wherein the pigment is included in the pigment dispersion in an amount of from 5% to 30% by weight based on total weight of the pigment dispersion.

8. The pigment dispersion according to claim 1, wherein the pigment has a volume average particle diameter of from 20 nm to 200 nm.

9. An inkjet ink composition comprising (a) a pigment, (b) a dispersant, (c) a dispersion medium comprising water, and (d) an additive selected from the group consisting of water-soluble organic solvents, surfactants and antiseptics, wherein the dispersant (b) comprises a first compound having the following formula (1):

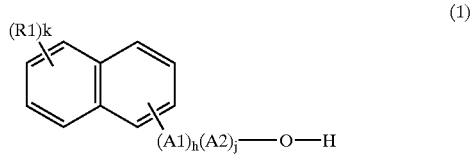

(1)

wherein R1 represents an alkyl group having from 1 to 20 carbon atoms, a phenyl group, a substituted phenyl group or a naphthyl group; k is 0 or an integer of from 1 to 7; A1 and A2 are independently an oxyethylene unit or an oxypropylene unit wherein A1 and A2 are not the same; and h and j are independently a positive integer, wherein a total number of h and j is from 31 to 100.

10. The inkjet ink composition according to claim 9, further comprising a second compound having a formula selected from the group consisting of the following formulae (2), (3) and (4):

$$R2\text{-}(A3)_m\text{-}OH \qquad (2)$$

wherein R2 represents an alkyl group having from 8 to 14 carbon atoms; A3 represents an oxyethylene unit or a combination of an oxyethylene and an oxypropylene unit; and m is an integer of from 3 to 16;

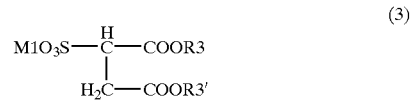

(3)

wherein M1 represents H, Li, Na, K or a group $N^+R4R5R6R7$ in which R4, R5, R6 and R7 independently represent a hydrogen atom, a methyl group, an ethyl group, a 2-hydroxyethyl group or a 3-hydroxypropyl group; and R3 and R3' independently represent an alkyl group having from 1 to 20 carbon atoms; and $$R8O\text{-}(A4)_x\text{-}CH_2COOM2 \qquad (4)$$

wherein R8 represents an alkyl group having from 1 to 20 carbon atoms; A4 represents an oxyethylene unit, an oxypropylene unit or a combination of an oxyethylene unit and an oxypropylene unit; M2 represents H, Li, Na, K or a group $N^+R9R10R11R12$ in which R9, R10, R11 and R12 independently represent a hydrogen atom, a methyl group, an ethyl group, a 2-hydroxyethyl group or a 3-hydroxypropyl group; and x is an integer of from 1 to 12.

11. The inkjet ink composition according to claim 10, wherein a ratio of the first compound to the second compound is from 99.99/0.01 to 60/40 by weight.

12. The inkjet ink composition according to claim 9, wherein the pigment is selected from the group consisting of Pigment Yellow 138, Pigment Red 122, Pigment Blue 15, Pigment Blue 15:1, Pigment Blue 15:2, Pigment Blue 15:3, Pigment Blue 15:4 and carbon black.

13. The inkjet ink composition according to claim 9, wherein a ratio of the pigment to the dispersant is from 15/1 to 1/1 by weight.

14. The inkjet ink composition according to claim 9, wherein the pigment is included in the inkjet ink composition in an amount of from 1% to 8% by weight based on total weight of the inkjet ink composition.

15. The inkjet ink composition according to claim 9, wherein the pigment has a volume average particle diameter of from 20 nm to 200 nm.

16. An image forming method comprising:

projecting an inkjet ink composition comprising (a) a pigment, (b) a dispersant, (c) a dispersion medium comprising water, and optionally (d) an additive selected from the group consisting of water-soluble organic solvents, surfactants and antiseptics, wherein the dispersant (b) comprises a compound having the following formula (1):

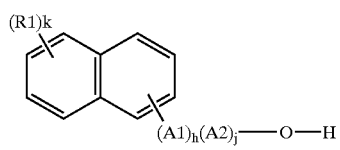 (1)

wherein R1 represents an alkyl group having from 1 to 20 carbon atoms, a phenyl group, a substituted phenyl group or a naphthyl group; k is 0 or an integer of from 1 to 7; A1 and A2 are independently an oxyethylene unit or an oxypropylene unit wherein A1 and A2 are not the same; and h and j are independently a positive integer, wherein a total number of h and j is from 31 to 100, from a nozzle of an inkjet recording head to form an image on a receiving material.

17. The image forming method according to claim 16, wherein said composition further comprises a second compound having a formula selected from the group consisting of the following formulae (2), (3) and (4):

 (2)

wherein R2 represents an alkyl group having from 8 to 14 carbon atoms; A3 represents an oxyethylene unit or a combination of an oxyethylene and an oxypropylene unit; and m is an integer of from 3 to 16;

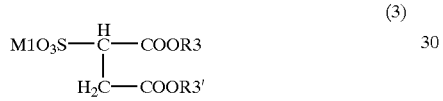 (3)

wherein M1 represents H, Li, Na, K or a group $N^+R4R5R6R7$ in which R4, R5, R6 and R7 independently represent a hydrogen atom, a methyl group, an ethyl group, a 2-hydroxyethyl group or a 3-hydroxypropyl group; and R3 and R3' independently represent an alkyl group having from 1 to 20 carbon atoms; and

 (4)

wherein R8 represents an alkyl group having from 1 to 20 carbon atoms; A4 represents an oxyethylene unit, an oxypropylene unit or a combination of an oxyethylene unit and an oxypropylene unit; M2 represents H, Li, Na, K or a group $N^+R9R10R11R12$ in which R9, R10, R11 and R12 independently represent a hydrogen atom, a methyl group, an ethyl group, a 2-hydroxyethyl group or a 3-hydroxypropyl group; and x is an integer of from 1 to 12.

18. The image forming method according to claim 16, wherein the pigment is included in the inkjet ink composition in an amount of from 1% to 8% by weight.

19. The image forming method according to claim 16, wherein the pigment has a volume average particle diameter of from 20 nm to 200 nm.

20. The image forming method according to claim 16, wherein the inkjet recording head is a piezoelectric inkjet recording head or a thermal inkjet recording head.

21. A method for manufacturing an inkjet ink composition, comprising:

adding at least one of water, a water-soluble organic solvent, a surfactant or an antiseptic to a pigment dispersion comprising (a) a pigment, (b) a dispersant, and (c) a dispersion medium comprising water, wherein the dispersant (b) comprises a compound having the following formula (1):

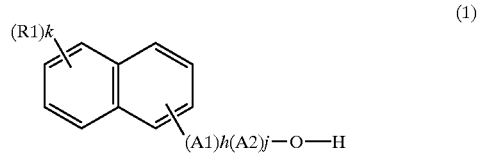 (1)

wherein R1 represents an alkyl group having from 1 to 20 carbon atoms, a phenyl group, a substituted phenyl group or a naphthyl group; k is 0 or an integer of from 1 to 7; A1 and A2 are independently an oxyethylene unit or an oxypropylene unit wherein A1 and A2 are not the same; and h and j are independently a positive integer, wherein a total number of h and j is from 31 to 100.

22. An ink receiving material comprising an image formed thereon in ink, said image having been formed by the image forming method of claim 16.

* * * * *